(12) United States Patent
Shiraishi et al.

(10) Patent No.: US 6,708,727 B2
(45) Date of Patent: Mar. 23, 2004

(54) PIPE STRUCTURE OF BRANCH PIPE LINE

(75) Inventors: Tadashi Shiraishi, Takasago (JP);
Yukiharu Nabika, Takasago (JP);
Shigeki Suzuki, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/129,970

(22) PCT Filed: Sep. 21, 2001

(86) PCT No.: PCT/JP01/08278

§ 371 (c)(1),
(2), (4) Date: May 22, 2002

(87) PCT Pub. No.: WO02/25163

PCT Pub. Date: Mar. 28, 2002

(65) Prior Publication Data

US 2002/0170605 A1 Nov. 21, 2002

(51) Int. Cl.$^7$ .................................................. F15D 1/04
(52) U.S. Cl. ............................ 138/39; 138/42; 138/44; 137/561 A
(58) Field of Search ............................ 138/39, 40, 42, 138/44; 137/561 A

(56) References Cited

U.S. PATENT DOCUMENTS

| | | | | |
|---|---|---|---|---|
| 1,942,783 A | * | 1/1934 | Tallmadge | 138/44 |
| 2,249,469 A | * | 7/1941 | Gray et al. | 138/44 |
| 2,746,406 A | * | 5/1956 | Karjala | 138/39 |
| 3,376,897 A | * | 4/1968 | Dolder et al. | 138/39 |
| 4,162,546 A | * | 7/1979 | Shortell | 138/37 |
| 4,217,097 A | * | 8/1980 | Gelsing et al. | 138/44 |
| 4,271,099 A | * | 6/1981 | Kukla | 138/40 |
| 4,424,989 A | * | 1/1984 | Spencer et al. | 138/40 |
| 4,666,675 A | * | 5/1987 | Parker et al. | 366/336 |
| 4,824,614 A | * | 4/1989 | Jones | 138/37 |
| 5,567,079 A | * | 10/1996 | Felder | 138/39 |
| 6,343,622 B1 | * | 2/2002 | Keijzer et al. | 138/39 |
| 6,460,562 B1 | * | 10/2002 | Hart | 137/351 |
| 6,474,364 B2 | * | 11/2002 | Ta et al. | 138/37 |

FOREIGN PATENT DOCUMENTS

| | | |
|---|---|---|
| JP | 153790/84 | 10/1984 |
| JP | 62/255605 | 11/1987 |
| JP | 1-275993 | 11/1989 |
| JP | 3-005023 | 1/1991 |
| JP | 049296/92 | 4/1992 |
| JP | 127496/92 | 11/1992 |
| JP | 4-357395 | 12/1992 |
| JP | 7-317999 | 12/1995 |

* cited by examiner

Primary Examiner—James Hook
(74) Attorney, Agent, or Firm—Oblon, Spivak, McClelland, Maier & Nuestadt, P.C.

(57) ABSTRACT

A water pipe structure of a branch pipe line (12) connected to a main pipe (22) for flowing water therethrough, wherein a cavity flow suppressing structure (30) is installed between the main pipe (22) and the branch pipe line (12) or in the branch pipe line to suppress a cavity flow produced in the closed branch pipeline, whereby the adverse effect of a thermal stratification formed by the cavity flow on the pipe can be eliminated.

3 Claims, 10 Drawing Sheets

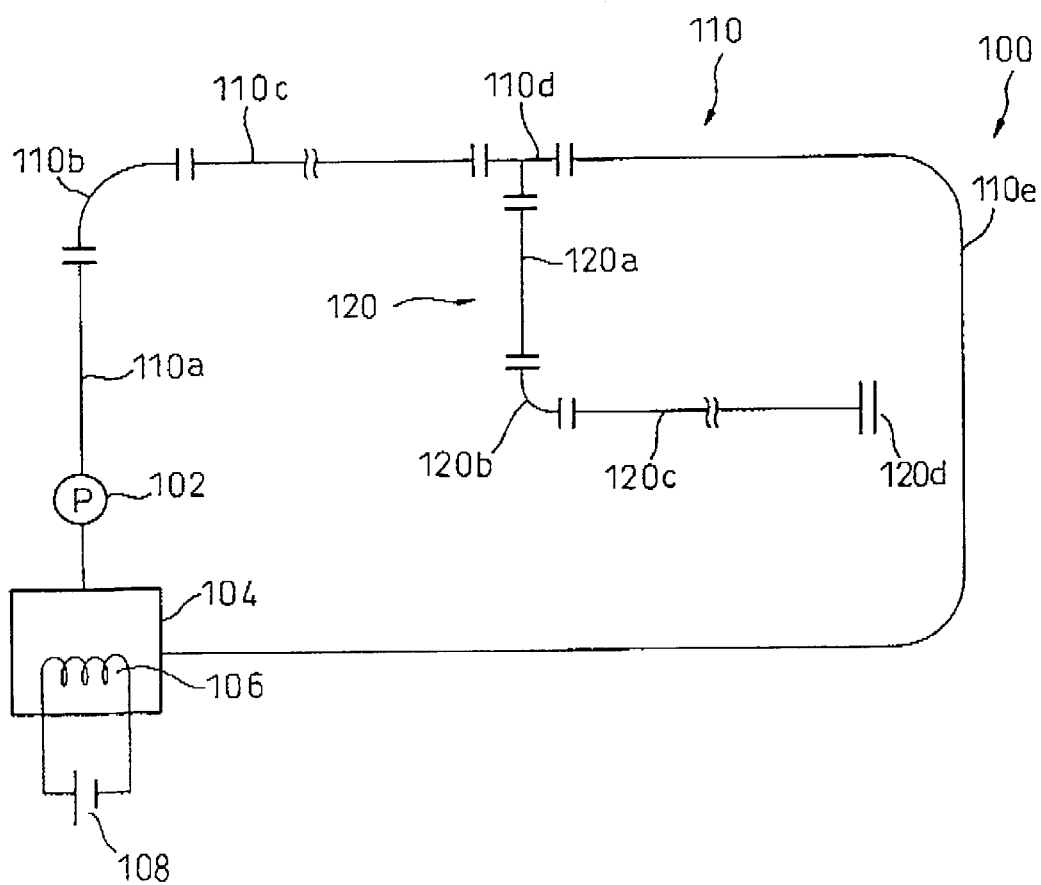

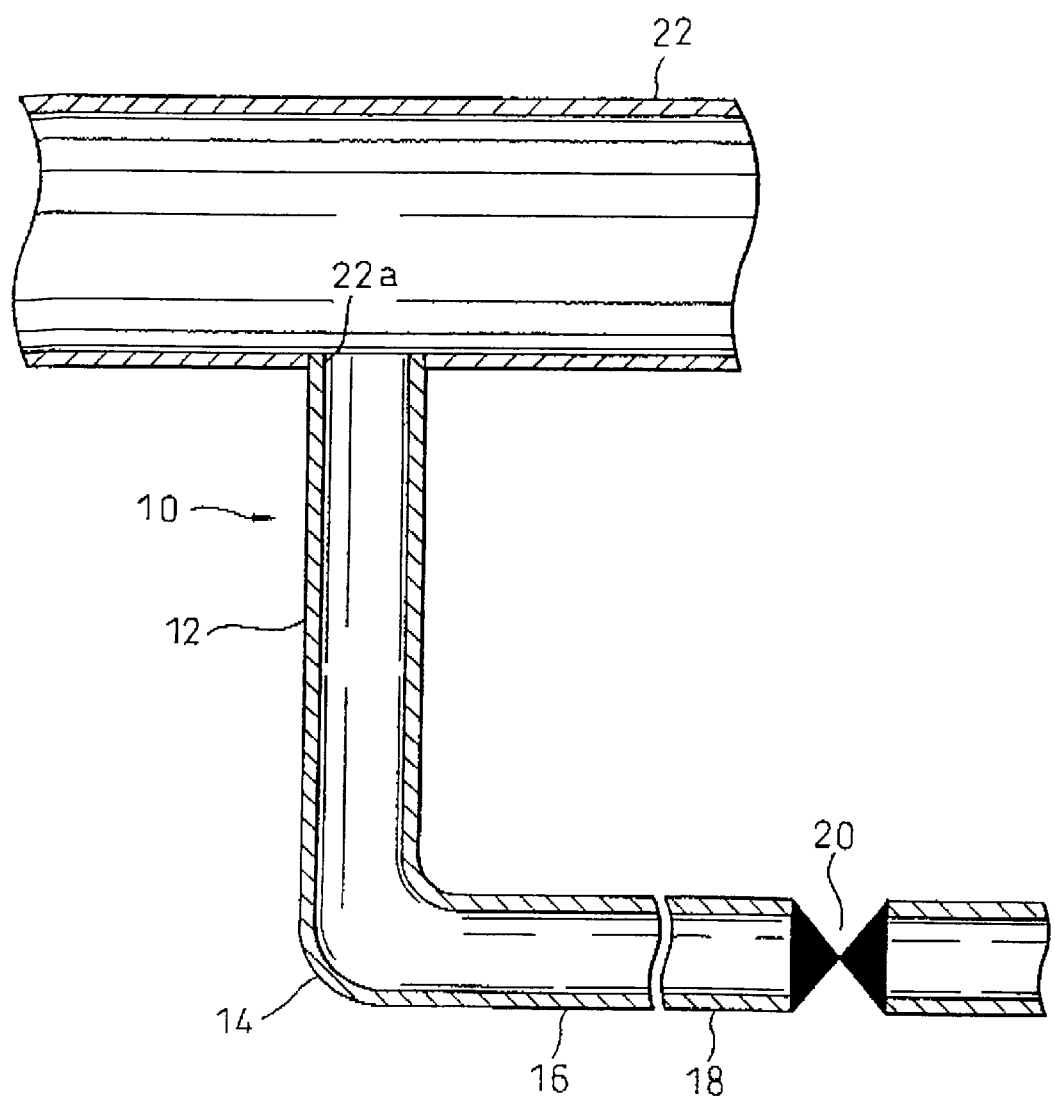

PIPE STRUCTURE OF BRANCH PIPE LINE

FIELD OF THE INVENTION

The invention relates to a water piping arrangement, and in particular to a water piping arrangement for avoiding adverse effect to the piping system based on a thermal stratification which is formed by a cavity flow which is generated in a closed pipe branched from a main pipe

DESCRIPTION OF THE PRIOR ART

A various branch pipes are generally connected to a main water pipe in a power plant or the other types of plant, in which some branch pipes are used during only the starting operation or the maintenance of the plant and closed by a shut-off valve provided in the branch pipes after the operation of the plant is transferred to a normal operation.

The inventors of the present application have found that such a branch pipe closed by a shut-off valve (hereinafter, referred to as a closed branch pipe) functions as a deep recess formed in a main pipe, and that, within the closed branch pipe, a cavity flow is induced by the water flow in the main pipe. If the cavity flow is affected by a heat dissipating action of the wall of the branched pipe, a thermal stratification appears in the water within the closed branch pipe, and the water temperature is suddenly changed across the thermal stratification so that a large thermal stress is generated in the pipe.

In the prior art, such a thermal stress in the pipes, based on the thermal stratification generated by the cavity flow, is not considered in the calculation of the piping design. If a thermal stratification appears in a pipe, in particular in an elbow joint of the piping system, a crack may be resulted in the elbow joint due to the thermal stress in the elbow joint.

DISCLOSURE OF THE INVENTION

The invention is directed to solve the above-described problem of the prior art, and to provide a piping arrangement of a branch pipe for avoiding adverse effect to the piping system, based on a thermal stratification generated by a cavity flow in the closed branch pipe.

According to the invention, there is provided a piping arrangement which comprises a main pipe allowing a water flow; a branch pipe connected to the main pipe; and cavity flow inhibiting means provided between the main pipe and the branch pipe.

The cavity flow inhibiting means may comprise:

a swirl preventing plate including at least two plates which intersect each other with an intersecting line extending in the direction of the flow in the branch pipe;

a sleeve which has a inner diameter larger than the outer diameter of the branch pipe and enclose a portion of the branch pipe connected to the main pipe;

a deflecting member provided over a portion of the branch pipe connected to the main pipe;

an orifice provided in the branch pipe;

a tube member which is provided in a portion of the branch pipe connected to the main pipe and has different inner diameters one of which is larger than that of the closed branch pipe;

an entrance radius enlarged portion with the sectional area of its flow channel being gradually reduced from the main pipe toward the branch pipe. cross pipe; or an inclined connecting pipe for obliquely connecting the branch pipe to the main pipe.

According to another feature of the invention, a piping arrangement of a branch pipe connected to a main pipe for allowing water to flow therethrough is provided. The branch pipe includes a cross pipe connected perpendicularly to the main pipe and a horizontal pipe connected to the cross pipe by an elbow joint so as to horizontally extend. The piping arrangement is characterized by the elbow joint being disposed in an area nearer than a transition ozone where a cellular vortex, generated in the branch pipe, is transformed into twister vortex.

The elbow joint is preferably disposed in a range within six times of the inner diameter of the branch pipe.

BRIEF DESCRIPTION OF THE DRAWINGS

FIG. 3 is a schematic illustration of the laboratory equipment showing its configuration;

FIG. 11 is a section of a piping arrangement illustrating a closed branch pipe which is connected to a main pipe.

THE MOST PREFERRED EMBODIMENT

Figure 1A:
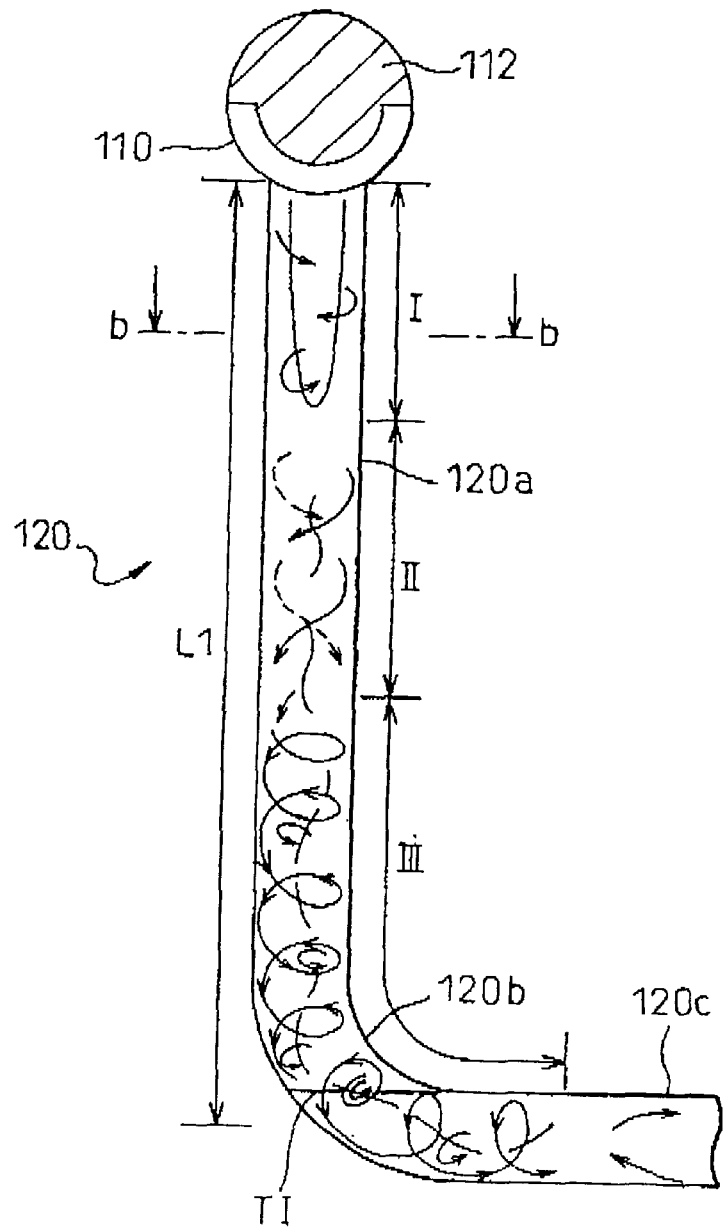
FIG. 1A is a schematic illustration of a laboratory equipment showing the formation of a cavity flow generated in a closed branch pipe.

A various preferred embodiments of the invention will be described below with reference to the accompanying drawings.

With reference to FIG. 11, a piping system to which the present invention is applied is shown. In FIG. 11, a branch pipe 10 is connected to a main pipe 22, providing a water main line (hereinafter, referred to main pipe 22), at a junction 22a. The branch pipe 10 has a cross pipe 12 and a horizontal pipe 14 connected to the cross pipe 12 by an elbow joint 14, and forms a closed branch pipe when a valve 20, provided in an extended portion 18 of the horizontal pipe 14, is closed. The extended portion 18 is not limited to the horizontal configuration.

In a large plant such as an electric power plant, a number of branch pipes are connected to a main pipe. Some of the branch pipes are used during only maintenance or the starting operation of the plant, and are not used during the normal operation of the plant with the valves on the branch pipes closed after the plant is started. A high temperature water often flows through such a main pipe. For example, a hot water of about 200 Celsius degrees or higher flows through a boiler water supply pipe in a conventional electric power plant and a water of about 300 Celsius degrees or higher flows through a primary cooling system in a nuclear power plant.

The branch pipe 10 connected to the main pipe 22 becomes a closed branch pipe when the valve 20 is closed. In the prior art, the flow in such a closed branch pipe is not considered in the piping design. In the prior art, it has been assumed that because a thermal medium or the water in the main pipe 22 does not flow into the closed branch pipe 10, the temperatures of the closed branch pipe 10 and the water therein gradually reduce and the temperature of the pipe reduces, in the direction from the junction toward the distal end thereof, from the temperature of the junction 22a, connected to the main pipe 22, to the ambient temperature due to the thermal dissipation through the wall of the closed branch pipe 10 after the start of the plant.

Figure 1B:
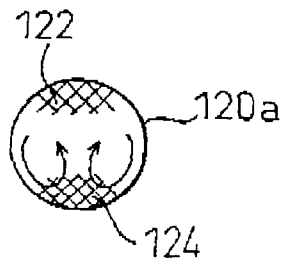
FIG. 1B is a section along line b—b in FIG. 1A.
Figure 2:
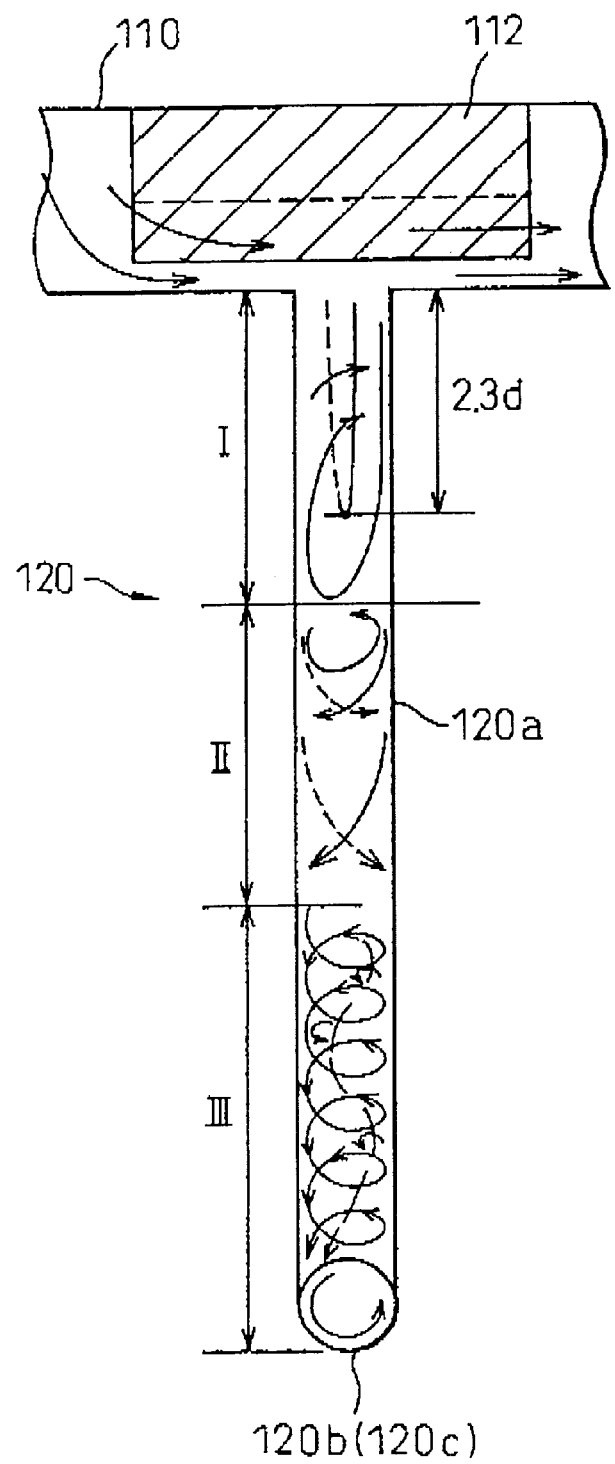
FIG. 2 is the laboratory equipment showing from another direction.

With reference to FIGS. 1–3, a laboratory equipment used for visualization experiment of a cavity flow executed by the inventors will be described below.

In FIG. 3, a visualization apparatus 100 includes a main pipe 110, a branch pipe 120, a pump for driving a water of a predetermined temperature through the main pipe 112 and a tank 104 for holding the water of the predetermined temperature. Within the tank 104, an electric heater 106 for maintaining the temperature of the water in the tank 104 at the predetermined temperature with an electric power source 108 supplying the electric power to the electric heater 106. The main pipe includes an outlet pipe 110a, a horizontal pipe 110c providing an entrance region connected at the downstream of the outlet pipe 110 a through an elbow joint 110b, a T-joint 110d for connecting a branch pipe 120 to the horizontal pipe 110c and a return pipe 110e for connecting the T-joint 110d and the tank 104. The branch pipe 120 includes a vertical pipe 120a connected to the T-joint 110d and a horizontal pipe 120c connected to the lower end of the cross pipe 120a by an elbow joint 120b with the distal end of the horizontal pipe 120c being closed by a blind cover 120d.

In this connection, in the experiment, a pipe of nominal size of 200A was used as the main pipe 110 and a pipe of nominal size of 100A was used as the closed branch pipe 120. The horizontal pipe 110c, providing the entrance region of the main pipe 110, has 10 m length to eliminate the influence of flow of the pump 102 and the elbow joint 110b. The length of the horizontal pipe 120c of the closed branch pipe 120 is 2300 mm. Further, the length of the cross pipe 120a (including the vertically branched portion of the T-joint 110d) is defined by L1=11.3d (d is the internal diameter of the horizontal pipe 110c). On the other hand, the flow within the return pipe 110e has little influence to the flow in the closed branch pipe 120, and therefore, the arrangement thereof is not limited. A core 112 is disposed in the T-joint 110d of the main pipe 110. By changing the size of the core 112, the flow velocity of the water through the T-joint 110d is changed.

Further, in the experiment, case (i), the normal temperatures water, a water of around 20 Celsius degrees, was used for the flows in both the water in the main pipe 110 and the closed branch pipe 120, and case (ii), a hot water, heated to 60–70 Celsius degrees by the electric heater 106 in the tank 104, was used for the flow through the main pipe 110 and the normal temperature water was used in the closed branch pipe 120, were compared. In this connection, the flow in the closed branch pipe 120 was observed by using ink, bubble and polystyrene particles with the relative density being previously adjusted. Further, in order to observe the decay in the rotating velocity of the swelling flow generated in the closed branch pipe 120, a hot film was disposed at a location from the wall surface to measure the velocity of the downflow.

The observation results of the flow, when the normal temperature water is used (case (i)), were shown in FIGS. 1 and 2. In the upper end region in the closed branch pipe 120 or the region within the branch pipe 120 adjacent the junction to the main pipe 110, indicated by reference symbol "I" in FIGS. 1 and 2, a cellular vortex, vortex fluctuating strongly as a two-dimensional cavity flow, is induced by the flow through the main pipe 110. With reference, in particular, to FIG. 1B, which is a section along line b—b in FIG. 1A, in the region I, a pair of left and right, relative to the main stream in the main pipe 110, vortexes are formed, which develop to the cellular vortex. The cellular vortex has a shape in the form of a hair pin including a downflow in the downstream side region 122 relative to the flow direction in the main pipe 110 and a upflow in the upstream side region 124.

In region II under the region I, the cellular vortex become unstable and unclear, and develop to a twister vortex described below. Thus, it is assumed that the region II provides a transition zone from the region I where the clear cellular vortex appears and to the region III where the twister vortex appears. A twister vortex, which includes a rotating downflow along the pipe wall and a upflow at the central region of the pipe, appears in the region III under the region II. The reason for the development of the above-described cellular vortex to the twister vortex is assumed that the cellular vortex cannot exist stable in the region II because of the circular cross-sectional shape of the branch pipe 120.

As described above, clear cellular vortex is appears in the region I. The cellular vortex has strong flow components in the axial direction of the closed branch pipe 120. The cellular vortex in the region II is unstable and unclear but also have strong flow components in the axial direction. In the experiment (i) shown in FIGS. 1 and 2, it was observed that the twister vortex in the region III extends deeply into the horizontal pipe 120c beyond the elbow joint 120b. The twister vortex is a helical vortex having strong circumferential flow components and weak axial flow components. In the case of experiment (i), it was observed that the rotating flow disappears at the distal end of the twister vortex and weakly layered natural circulation is generated. The reason for the generation of the natural circulation is assumed that the temperature of the water flowing through the main pipe 110 becomes slightly higher than the normal temperature of the water in the closed branch pipe 120 due to the heat input from the pump 102.

On the other hand, in the case of the experiment (ii), when the temperature difference between the waters in the main pipe 110 and in the closed branch pipe 120 is about 40 Celsius degrees, a stable thermal stratification appears in the middle of the elbow joint 120b and the above-described natural circulation is inhibited. In particular, the boundary surface of the thermal stratification appears in the elbow joint 120b at level T1, substantially the same as the top of the horizontal pipe 110c. The reason for this is assumed that the axial flow components of the twister vortex is gradually decayed and the heat dissipation through the horizontal pipe 110c increases toward the distal end thereof so that the stability of the thermal stratification is increased due to the turbulence inhibitory action by the buoyant force.

Thus, it is assumed that the cavity flow induced within the closed branch pipe 120 is extended to the end of the twister vortex, and the length of the cavity flow in the closed branch pipe 120 is defined by the decay characteristics of the axial components of the twister vortex and the stability of the thermal stratification.

In this connection, the twister vortex did not appear within a region from the opening 114 to the range of about six times of the inner diameter "d" of the closed branch pipe 120. Thus, the terminal end of the transition zone II was observed at a position farther than the range of six times of the inner diameter "d" of the closed branch pipe 120. This is because the cellular vortex has an extent about three times of the inner diameter of a pipe and the region II is a zone where the second cellular vortex is generated.

When the thermal stratification is generated, in the proximal region from the thermal stratification T1 to the opening 114, the water in the main pipe 110 circulates in so that the temperature thereof is substantially the same as that of the water in the main pipe 110. In the distal region from the thermal stratification T1, the water in the main pipe 110 does not circulate in so that the temperature is maintained to the initial temperature, i.e., about 20 Celsius degrees so that the temperature suddenly changes across the thermal stratification T1 and a steep temperature gradient is generated. This makes a large thermal stress in the pipe around the thermal stratification T1. As described above, when a large temperature difference between the water in the main pipe 110 and that in the closed branch pipe 120 is generated, the thermal stratification T1 appears in the elbow joint 120b at the level the same as the top of the horizontal pipe 110c. The elbow joint 120b is a member which has tendency to be broken when a thermal stress is applied. Therefore, the condition in which a thermal stratification appears in an elbow joint of a closed branch pipe in a plant for a long term, it is expected that the elbow joint may be broken. Therefore, it is important to prevent the generation of a thermal stratification in an elbow joint due to the cavity flow induced in such a closed branch pipe.

A thermal stratification is not generated or is generated in the closed branch pipe near the opening 114, if the water in the main pipe is prevented from circulating in the deep location in the closed branch pipe by preventing or inhibiting the generation of a cavity flow, since the thermal stratification is generated in the deep location in the closed branch pipe, as described above, by the circulation of the water in the main pipe into the closed branch pipe due to the cavity flow, as one of the measures for preventing the elbow joint 120b from being affected by a large thermal stress.

With reference to FIGS. 4–10, various embodiments of cavity flow inhibiting means will be described below.

Figure 4A:
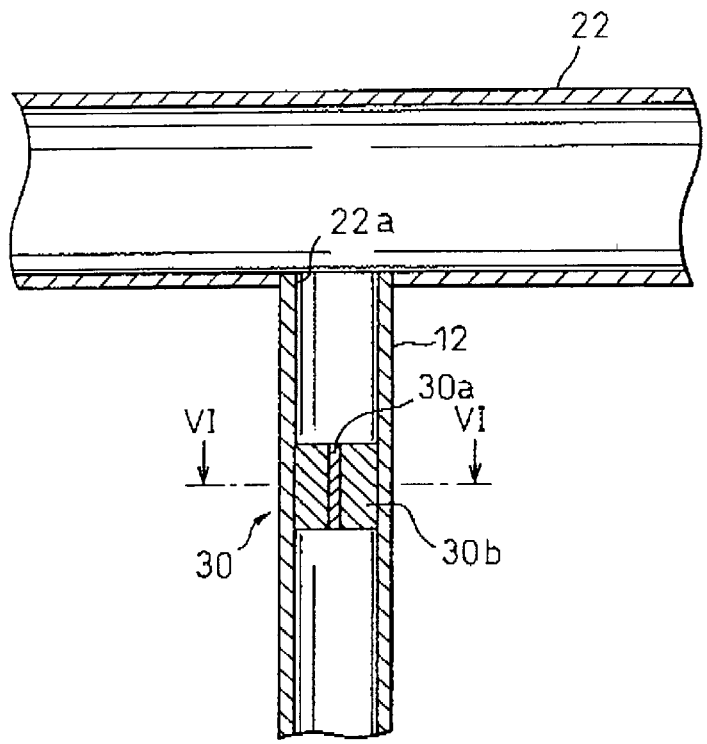
FIG. 4A is a section of a piping arrangement similar to FIG. 1A, showing an example of the cavity flow inhibiting means.
Figure 4B:
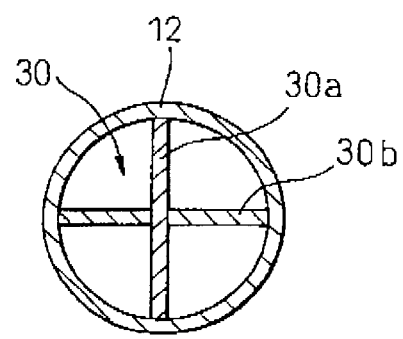
FIG. 4B is a section along line VI—Vi in FIG. 4A.

In the embodiment of FIG. 4, a swirl preventing plate 30 is provided as the cavity flow inhibiting means. The swirl preventing plate 30 comprises two plate members 30a and 30b which extend in planes including the axis of the cross pipe 12. The plate members 30a and 30b intersect, preferably perpendicularly at the center of the closed branch pipe 120a as shown in FIG. 4E, to each other with an intersecting line extending in the flow direction. The swirl preventing plate 30 is preferably disposed in the transition region II or at a location in the region III adjacent the transition region II where the twister vortex may be generated. The swirl preventing plate 30 divides the inside of the cross pipe 12 into four volumes. Therefore, the generation of a twister vortex is prevented so that a cavity flow cannot flow beyond the swirl preventing plate 30.

Figure 5:
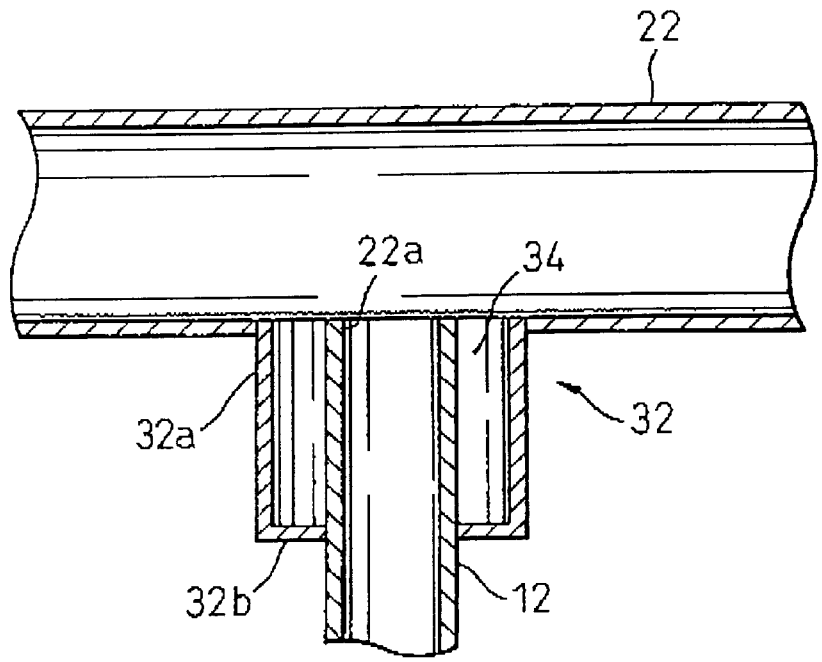
FIG. 5 is a section of a piping arrangement similar to FIG. 4A, showing another embodiment of the cavity flow inhibiting means.

In the embodiment of FIG. 5, a sleeve 32 with a bottom is provided as the cavity flow inhibiting means. The sleeve 32 comprises a peripheral wall 32a having an inner diameter larger than the outer diameter of the cross pipe 12 and a bottom 32b which is connected between the peripheral wall 32a and the cross pipe 12. The sleeve is disposed so as to enclose the opening 22a or the junction connected to the main pipe 22. Thus, the provision of the sleeve 32 around the opening 22a of the cross pipe 12 to the main pipe 22 allows the water within a volume 32 between the cross pipe 120a and the peripheral wall 32a to move by the shear action of the water flowing through the main pipe 22 so that turbulence is generated around the opening 22a. This weakens the cellular vortex generated in the cross pipe 12 to prevent the cavity flow from entering into the closed branch pipe 10.

Figure 6:
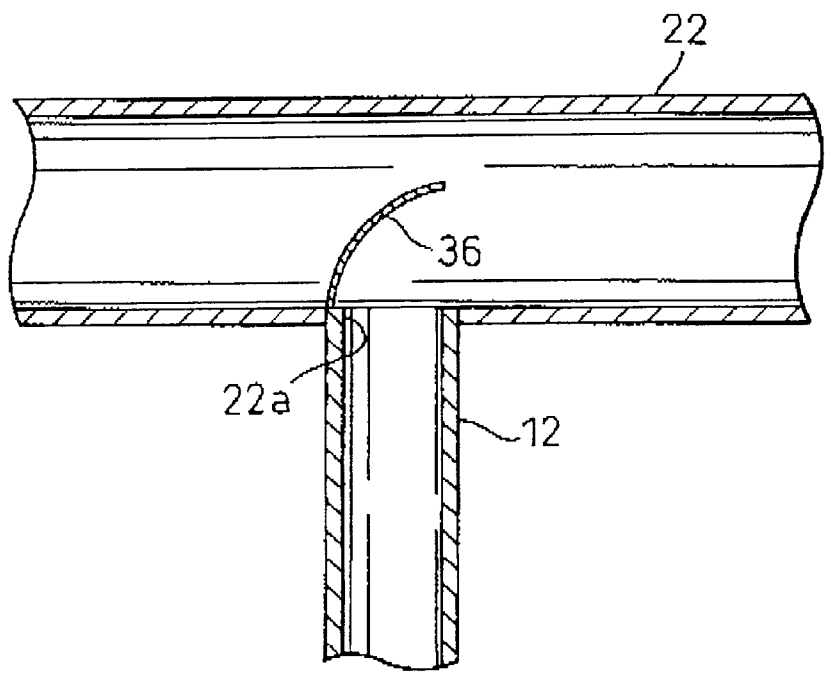
FIG. 6 is a section of a piping arrangement similar to FIG. 4A, showing another embodiment of the cavity flow inhibiting means.

In the embodiment of FIG. 6, a scoop or deflecting member 36 is provided over the opening 22a as the cavity flow inhibiting means. The scoop or the deflecting member 36 has preferably a shape of a portion of a sphere and prevents the cavity flow from entering into the closed branch pipe 10 by reducing the shearing action of the water flowing through the main pipe 22 for the water in the closed branch pipe 10.

Figure 7A:
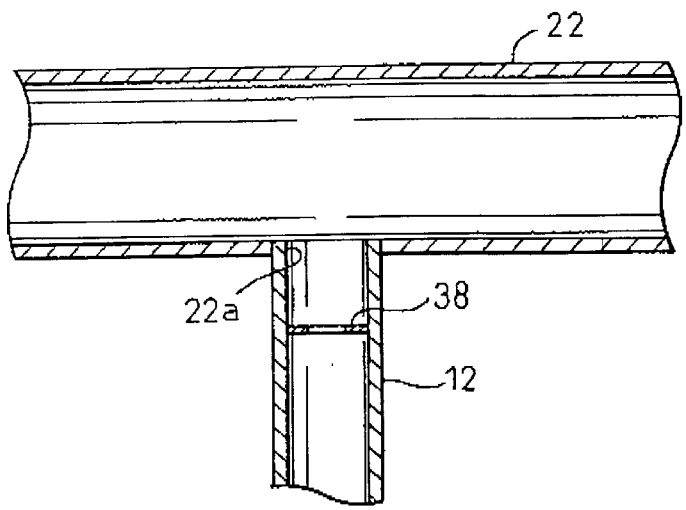
FIG. 7A is a section of a piping arrangement similar to FIG. 4A, showing another embodiment of the cavity flow inhibiting means.
Figure 7B:
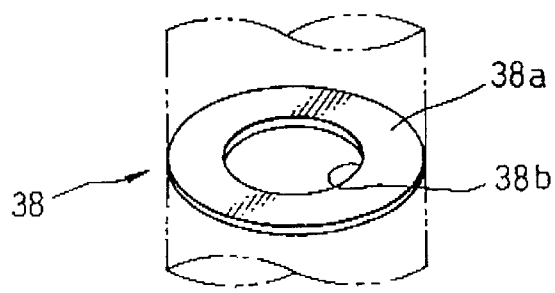
FIG. 7B is a perspective view showing an example of an orifice as the cavity flow inhibiting means.
Figure 7C:
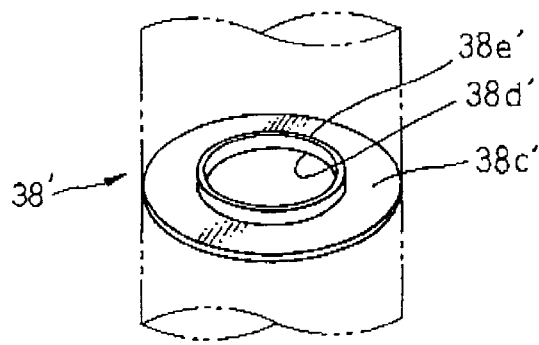
FIG. 7C is a perspective view showing another example of an orifice as the cavity flow inhibiting means.

In the embodiment of FIG. 7A, an orifice 38 is provided as the cavity flow inhibiting means. The orifice 38 reduces the entrance of the cellular vortex and the twister vortex. Thus, the orifice 38 inhibits the formation of the cellular vortex in the form of a hear pin. The orifice 38 may be formed by a central opening 38b defined by an annular plate member 38a, as shown in FIG. 7B. The orifice may include a rising portion or collar 38e provided along the periphery of the central opening 38d of the annular plate member 38c.

Figure 8:
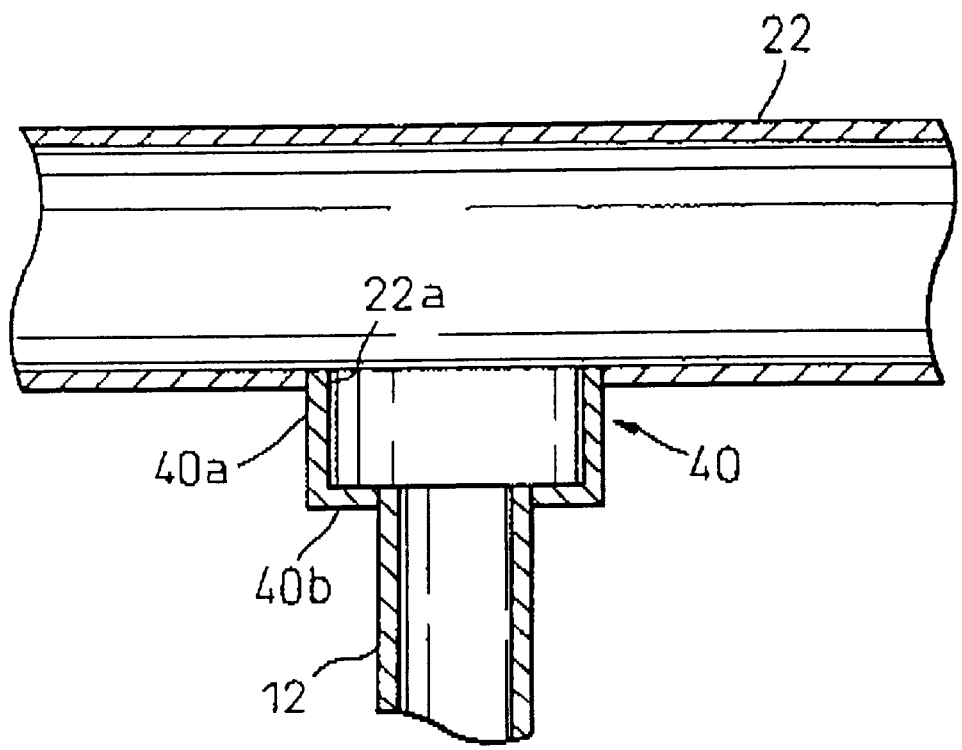
FIG. 8 is a section of a piping arrangement similar to FIG. 4A, showing another embodiment of the cavity flow inhibiting means.

In the embodiment of FIG. 8, a tube member 40 having different diameters is provided as the cavity flow inhibiting means. The tube member includes a peripheral wall 40a, which has an inner diameter larger than the inner diameter of the closed branch pipe 10 and is connected to the main pipe 22, and an annular bottom portion 40b which is connected to the peripheral wall 40a and the cross pipe 12. Thus, provision of the tube member 40 allows the flow, in the form of a hear pin induced by the flow through the main pipe 22, to impinge against the bottom portion 40b of the tube member 40 and to be broken. Therefore, it cannot enter the cross pipe 12 of the closed branch pipe 10 so that the cellular vortex is weakened.

Figure 9A:
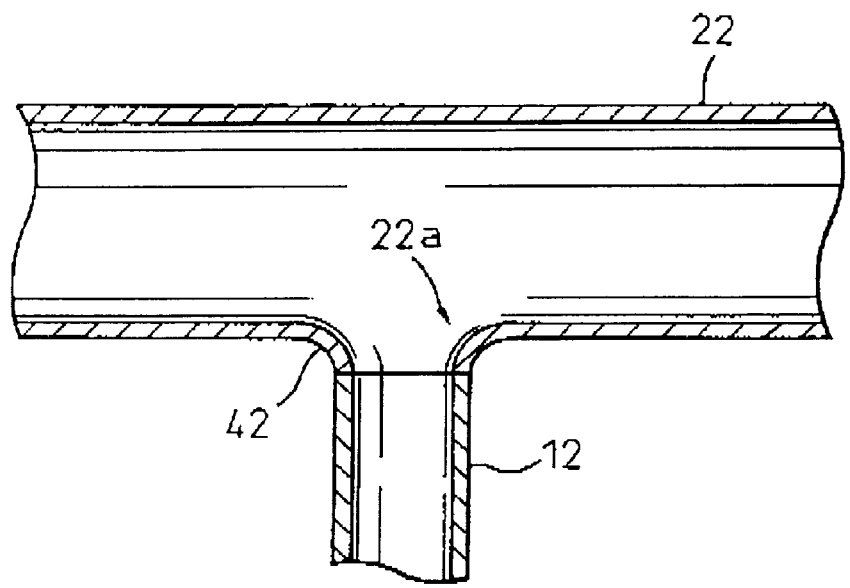
FIG. 9A is a section of a piping arrangement similar to FIG. 4A, showing an entrance radius enlarged portion as the cavity flow inhibiting means.
Figure 9B:
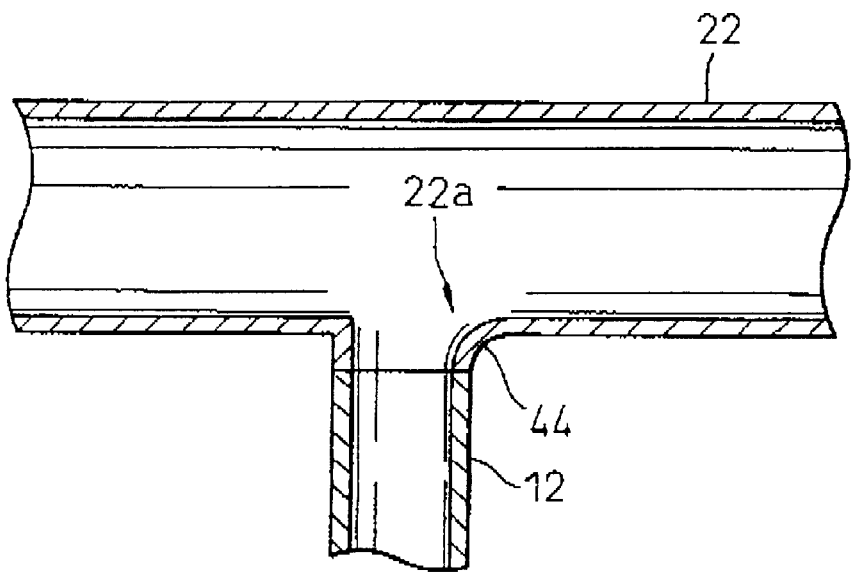
FIG. 9B is a section of a piping arrangement similar to FIG. 4A, showing another example of the entrance radius enlarged portion as the cavity flow inhibiting means.

In the embodiment shown in FIG. 9, entrance radius enlarged portions 42 and 44 are provided as the cavity flow inhibiting means. The entrance radius enlarged portions 42 and 44 are tubular members with the sectional area of their flow channels being gradually reduced from the main pipe 22 toward the cross pipe 12. In the embodiment of FIG. 9A, in particular, the enlarged radius entrance portion 42 has a symmetric configuration relative to the axis of the cross pipe 12. In the embodiment of FIG. 9B, the enlarged radius entrance portion 44 has an asymmetric configuration, in which the upstream side in the flow direction in the main pipe 22 relative to the axis of the cross pipe 12, perpendicularly intersects the main pipe 22 but on the downstream side the sectional area of the flow channel is gradually reduced. Thus, the provision of the entrance radius enlarged portion 42 and 44 between the main pipe 22 and the cross pipe 12 weakens the cellular vortex, therefore, the twister vortex and the cavity flow in the cross pipe 12 are weakened.

Figure 10:
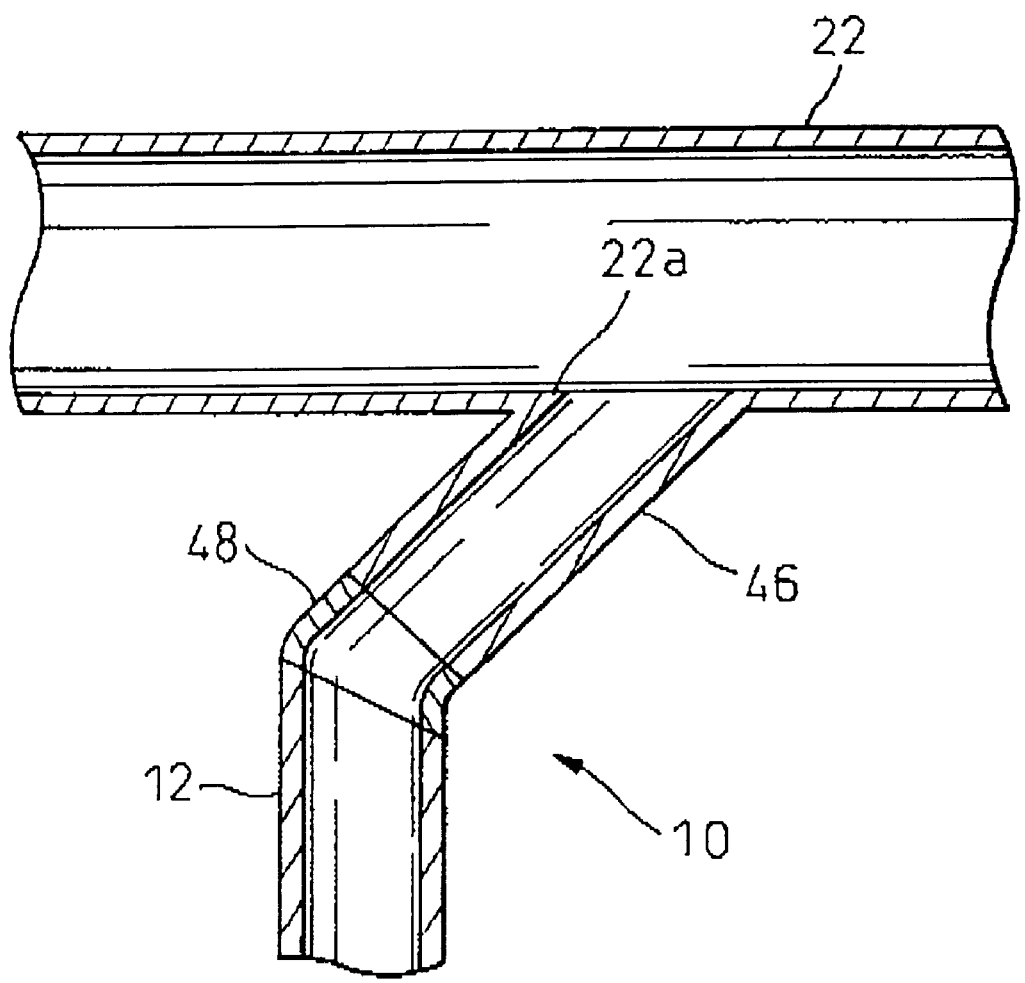
FIG. 10 is a section of a piping arrangement similar to FIG. 4A, showing another embodiment of the cavity flow inhibiting means.

In the embodiment shown in FIG. 10, the closed branch pipe 10 includes an inclined connecting pipe 46, as the cavity flow inhibiting means, for obliquely connecting the cross pipe 12 to the main pipe 22. In the embodiment shown in FIG. 10, the cross pipe 12 is connected to the inclined connecting pipe 46 by a bend joint having 45 degrees and the inclined connecting pipe 46 is connected to the main pipe 22 toward the downstream of the flow in the main pipe 22 with angle of 45 degrees. Thus, provision of the inclined connecting pipe 46 between the cross pipe 12 and the main pipe 22 weakens the cellular vortex, therefore, the twister vortex and the cavity flow in the cross pipe 12 are weakened.

In the embodiment described above, the generation of the cavity flow is prevented or inhibited to prevent the water in the main pipe from circulating deeply into the closed branch pipe whereby the formation of the thermal stratification in the closed branch pipe 10 or adjacent the opening 22a is prevented so as to prevent a large thermal stress in the elbow joint 14. In other word, in the embodiment of FIGS. 4–10, the formation of the thermal stratification is prevented or the thermal stratification is formed upstream of the elbow joint 14 on the other hand, if the thermal stratification is formed in the closed branch pipe 10 downstream of the elbow joint 14, the large thermal stress in the elbow joint 14 can be prevented.

As described above, the cellular vortex has strong flow components in the axial direction, which provide the water in the main pipe 22 with driving force for circulation into the closed branch pipe 10. If the axial flow components are large in the closed branch pipe 10, the stratification by buoyant force is avoided or reduced. Therefore, the thermal stratification does not appear in an area where the cellular vortexes exist. On the other hand, the axial flow components of the twister vortex are weak so that a thermal stratification is easily appears. Further, in the closed branch pipe 10, region I where a clear cellular vortex appears and region II where a unclear cellular vortex appears, the region II providing a transition zone from the cellular vortexes to the twister vortex are formed. Therefore, by disposing the elbow joint 14 between the regions I and II, the formation of the thermal stratification in the elbow joint 14 can be prevented. In particular, a cellular vortex has a size of three times of the inner diameter of a pipe. Therefore, by disposing the elbow joint 14 within a range within six times of the inner diameter from the opening 22a, the formation of the thermal stratification in the elbow joint can be prevented.

Incidentally, although the cross pipe 12 is shown to vertically extend in the above-described embodiments, the invention is not limited to this configuration and the cross pipe 12 may be extend vertically, horizontally or an angle therebetween.

Further, although it is described that the main pipe provides a water main line in a plant in the above-described embodiment, the invention is not limited to this configuration and any water pipe through which a hot water above 40 Celsius degrees flow at a relatively high flow rate.

What is claimed is:

1. A piping system comprising:

a main pipe which allows a water flow;

a branch pipe connected to the main pipe; and a swirl preventing plate positioned in the branch pipe at a point which is at least two point three times an inner diameter of the branch pipe farther from a junction portion of the main pipe, the swirl preventing plate including at least two plates intersecting each other along the branch pipe.

2. A piping system comprising:

a main pipe which allows a water flow;

a branch pipe connected to the main pipe; and an annular plate positioned to prevent cavity flow in the branch pipe and having a central opening and a collar provided along the periphery of the central opening of the annular plate member.

3. A piping system comprising:

a main pipe which allows a water flow;

a branch pipe connected to the main pipe; and cavity flow inhibiting means for inhibiting cavity flow in the branch pipe, the cavity flow inhibiting means being positioned in the branch pipe at a point which is at least two point three times an inner diameter of the branch pipe farther from a junction with the main pipe.

* * * * *

UNITED STATES PATENT AND TRADEMARK OFFICE
CERTIFICATE OF CORRECTION

PATENT NO. : 6,708,727 B2
DATED : March 23, 2004
INVENTOR(S) : Shiraishi et al.

It is certified that error appears in the above-identified patent and that said Letters Patent is hereby corrected as shown below:

<u>Title page,</u>
Item [30], should read:
-- [30]     Foreign Application Priority Data
Sep. 22, 2000   (JP) ............................…......... 2000-289212 --

Signed and Sealed this

Twenty-fifth Day of May, 2004

JON W. DUDAS
*Acting Director of the United States Patent and Trademark Office*